United States Patent
Heberer et al.

(10) Patent No.: US 9,995,538 B2
(45) Date of Patent: Jun. 12, 2018

(54) CLEAT ARRANGEMENT FOR ACCESSORY INSTALLATION TO A HEATING OR COOLING SYSTEM COMPONENT

(71) Applicant: Carrier Corporation, Farmington, CT (US)

(72) Inventors: Dwight H. Heberer, Brownsburg, IN (US); Kent Kuffner, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 562 days.

(21) Appl. No.: 14/075,340

(22) Filed: Nov. 8, 2013

(65) Prior Publication Data
US 2014/0190657 A1    Jul. 10, 2014

Related U.S. Application Data

(60) Provisional application No. 61/750,562, filed on Jan. 9, 2013.

(51) Int. Cl.
| | |
|---|---|
| F28D 17/00 | (2006.01) |
| F28D 21/00 | (2006.01) |
| F28F 9/007 | (2006.01) |
| F24F 13/32 | (2006.01) |
| F24F 12/00 | (2006.01) |

(52) U.S. Cl.
CPC ........ F28D 21/0001 (2013.01); F24F 12/006 (2013.01); F24F 13/32 (2013.01); F28F 9/0075 (2013.01); Y02B 30/563 (2013.01)

(58) Field of Classification Search
CPC ..... F28D 21/0001; F28F 9/0075; F24F 13/32; F24F 12/006; Y02B 30/563
USPC .......................................................... 165/4
See application file for complete search history.

(56) References Cited

U.S. PATENT DOCUMENTS

| | | | | |
|---|---|---|---|---|
| 1,797,533 | A * | 3/1931 | Stokes | F02M 1/00 |
| | | | | 123/495 |
| 1,966,034 | A * | 7/1934 | Hensler | F24D 5/00 |
| | | | | 261/95 |
| 2,122,161 | A * | 6/1938 | Smith | F25B 17/08 |
| | | | | 62/147 |

(Continued)

FOREIGN PATENT DOCUMENTS

| | | | |
|---|---|---|---|
| WO | WO 2017197854 A1 * | 11/2017 | F24F 13/32 |

Primary Examiner — Ljiljana Ciric
(74) Attorney, Agent, or Firm — Cantor Colburn LLP

(57) ABSTRACT

An energy recovery system includes a heating or cooling system and an accessory operably connected to the heating or cooling system, or to a component of the heating or cooling system. One or more accessory interlocking mechanisms are located at the housing interlocked with one or more complementary interlocking mechanisms located at the system or the component of the heating or cooling system to secure the accessory directly to the component. A method of securing an accessory to a heating or cooling system or a component of a heating or cooling system includes aligning one or more accessory interlocking mechanisms with one or more interlocking mechanisms. The accessory is urged toward an installed position by moving the accessory along a length of the one or more complementary interlocking mechanisms. The one or more accessory interlocking mechanisms are interlocked with the complementary interlocking mechanisms to secure the accessory.

6 Claims, 8 Drawing Sheets

(56) References Cited

U.S. PATENT DOCUMENTS

| | | | | |
|---|---|---|---|---|
| 2,660,409 A * | 11/1953 | Pittenger, Jr. | ............ | F24D 3/165 165/133 |
| 2,815,938 A * | 12/1957 | Impey | ................. | F24D 3/02 165/104.14 |
| 4,454,863 A * | 6/1984 | Brown | ................. | F24J 2/045 126/622 |
| 4,870,830 A * | 10/1989 | Hohenwarter | ............ | F17C 9/00 62/295 |
| 5,230,719 A * | 7/1993 | Berner | ................. | F24F 3/1411 165/4 |
| 5,375,649 A * | 12/1994 | Nilsen | ................. | F24F 7/013 165/4 |
| 5,720,599 A * | 2/1998 | Myers | ................. | F01C 21/007 165/97 |
| 6,182,903 B1 * | 2/2001 | Fiedrich | ................. | F24D 3/16 237/69 |
| 6,315,257 B1 * | 11/2001 | Fennesz | ................. | F24D 19/04 248/209 |
| 7,726,391 B2 * | 6/2010 | Seo | ................. | B60H 1/00064 165/202 |
| 8,051,637 B2 * | 11/2011 | Labrador | ............ | F01K 27/00 60/39.01 |
| 8,288,689 B1 * | 10/2012 | Adelman | ............ | H05B 3/146 219/200 |
| 9,816,725 B2 * | 11/2017 | Kwon | ................. | F24F 12/006 |
| 2001/0002668 A1 * | 6/2001 | Gat | ................. | H01L 21/67115 219/390 |
| 2003/0004470 A1 * | 1/2003 | Hickerson | ............ | A61M 5/445 604/251 |
| 2005/0088005 A1 * | 4/2005 | Krueger | ............ | B60R 5/04 296/37.8 |
| 2005/0224031 A1 * | 10/2005 | Knight | ............ | F16K 31/025 123/142.5 R |
| 2006/0061104 A1 * | 3/2006 | Jungers | ............ | F16L 33/03 285/420 |
| 2010/0154785 A1 * | 6/2010 | Hulen | ............ | E01C 11/26 126/623 |
| 2011/0107915 A1 * | 5/2011 | Castrigno | .......... | B01D 19/0042 96/165 |
| 2012/0267067 A1 * | 10/2012 | Sullivan | ............ | F24D 3/141 165/56 |
| 2013/0221192 A1 * | 8/2013 | Rocco | ............ | B22C 9/10 249/177 |
| 2014/0202449 A1 * | 7/2014 | Snyder | ............ | F24F 5/0035 126/714 |
| 2014/0299120 A1 * | 10/2014 | Klinkman | ............ | F24J 2/34 126/620 |
| 2015/0038067 A1 * | 2/2015 | Byon | ............ | B60H 1/00021 454/160 |
| 2017/0328596 A1 * | 11/2017 | Darby | ............ | F24F 13/32 |

\* cited by examiner

CLEAT ARRANGEMENT FOR ACCESSORY INSTALLATION TO A HEATING OR COOLING SYSTEM COMPONENT

BACKGROUND

Embodiments relate generally to heating or cooling systems and, more particularly, to an accessory that attaches directly to an existing furnace, fan coil or air handler.

An ERV is an accessory generally used with a heating or cooling system to exhaust stale air from a stale air space to a fresh air space and bring in fresh air from the fresh air space to the stale air space while exchanging heat or cool energy, thereby reducing heating or cooling requirements. Typically, an ERV includes a heat exchanger contained in a housing for exchanging heat or cool energy. When the ERV is used with a heating or cooling system, an outside air stream from the outdoors and a stale room air stream from the return air duct separately enter the ERV and pass through the heat exchanger. Within the heat exchanger, energy from the stale room air stream is transferred either to or from the outside air stream. The outside air stream then exits the ERV to the supply air duct as a fresh air stream. The stale room air stream then exits the ERV to the outdoors as an exhaust room air stream.

Most residential ERVs are mounted on a wall or ceiling and generally require four duct pipes to exchange cool or heat energy with an air handler system. In an example, the outside air stream and the stale room air stream enter the housing through duct pipes connected to two air flow openings in the housing. The fresh air stream and the exhaust room air stream exit the housing through two other duct pipes connected to two other air flow openings in the housing. These ERVs are standalone heat exchangers that are remotely mounted from the heating or cooling system and are not designed to be connected directly to a furnace or an air handler in a heating or cooling system. As connected to the heating or cooling system, this ERV is costly and cumbersome to install as it requires the installation of four separate duct pipes to carry each air stream to or from the fresh air or stale air spaces. Moreover, these ERVs require low voltage wall controls and an available power receptacle, which further complicates the installation process.

Other ERV's are configured to connect directly to a component such as a furnace or air handler blower compartment, eliminating the need for the four duct pipes. These ERV's, however, are difficult to install to the furnace or air handler components, requiring accurate positioning of ports in the ERV to openings in the component. Further, the location must be established while maintaining the integrity of a sealing gasket between the ERV and the component. This installation is typically accomplished using an installation kit including chains or straps to hang the ERV in position from a ceiling joist of the building into which it is installed. This method lacks the accuracy and ease of installation desired.

BRIEF DESCRIPTION

According to one aspect of the invention, an energy recovery system includes a heating or cooling system and an accessory operably connected to the heating or cooling system, or a component of the heating or cooling system. One or more accessory interlocking mechanisms are located at the housing interlocked with one or more complementary interlocking mechanisms located at the heating or cooling system, or at a component of the heating or cooling system to secure the accessory directly to the system or to the component.

According to another aspect of the invention, a method of securing an accessory to a heating or cooling system, or to a component of the heating or cooling system includes aligning one or more accessory interlocking mechanisms located at the accessory with one or more complementary interlocking mechanisms located at the system or at the component. The accessory is urged toward an installed position by moving the accessory along a length of the one or more complementary interlocking mechanisms. The one or more accessory interlocking mechanisms are interlocked with the complementary interlocking mechanisms via the urging to secure the accessory to the system or to the component.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
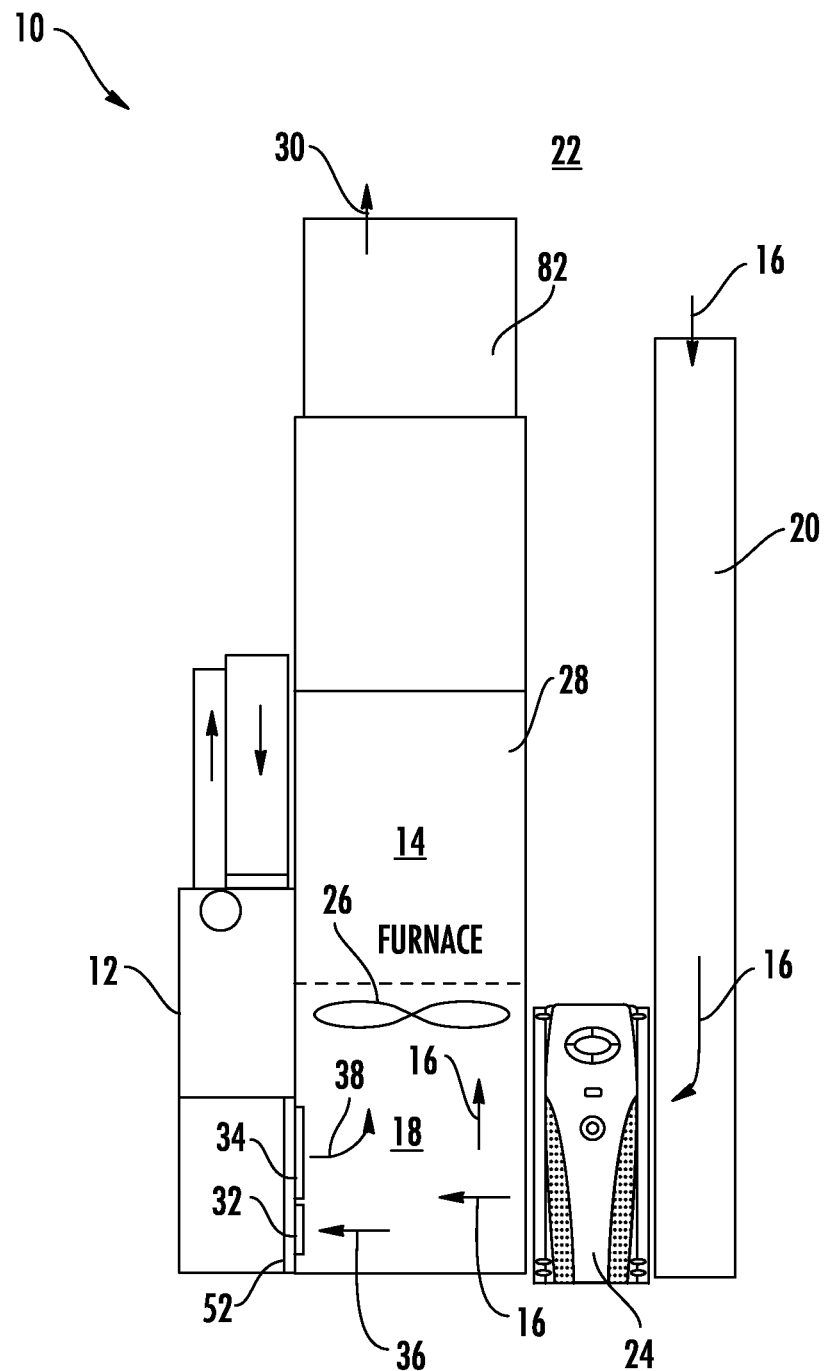
FIG. 1 is a view of an embodiment of a heating or cooling system including an energy recovery ventilator (ERV)

Shown in FIG. 1 is an embodiment of a heating or cooling system 10 including an energy recovery ventilator (ERV) 12. The heating or cooling system 10 includes a furnace/fan coil 14 receiving an air flow 16 from a circulation blower compartment 18. The blower compartment 18 is, in turn, connected to a return air duct 20, which conveys the air flow 16 from a conditioned space 22. In some embodiments, an air cleaner such as an air purifier 24 is provided to filter the air flow 16 entering the blower compartment 18. A circulation air blower 26 in the blower compartment 18 urges the air flow 16 from the blower compartment 18, into a furnace/fan coil compartment 28 where the air flow is conditioned by the furnace/fan coil 14 resulting in a conditioned airflow 30. The conditioned airflow 30 is urged to the conditioned space 22 through an air supply duct 82.

In the embodiment of FIG. 1, the ERV 12 is connected directly to the blower compartment 18 an includes a return port 32, through which a stale airflow 36, which is a portion of air flow 16, flows from the blower compartment 18 into the ERV 12. Further, the ERV 12 is connected directly to the blower compartment 18 via a supply port 34, through which a fresh airflow 38 flows from the ERV 12 and into the blower compartment 18.

Figure 2:
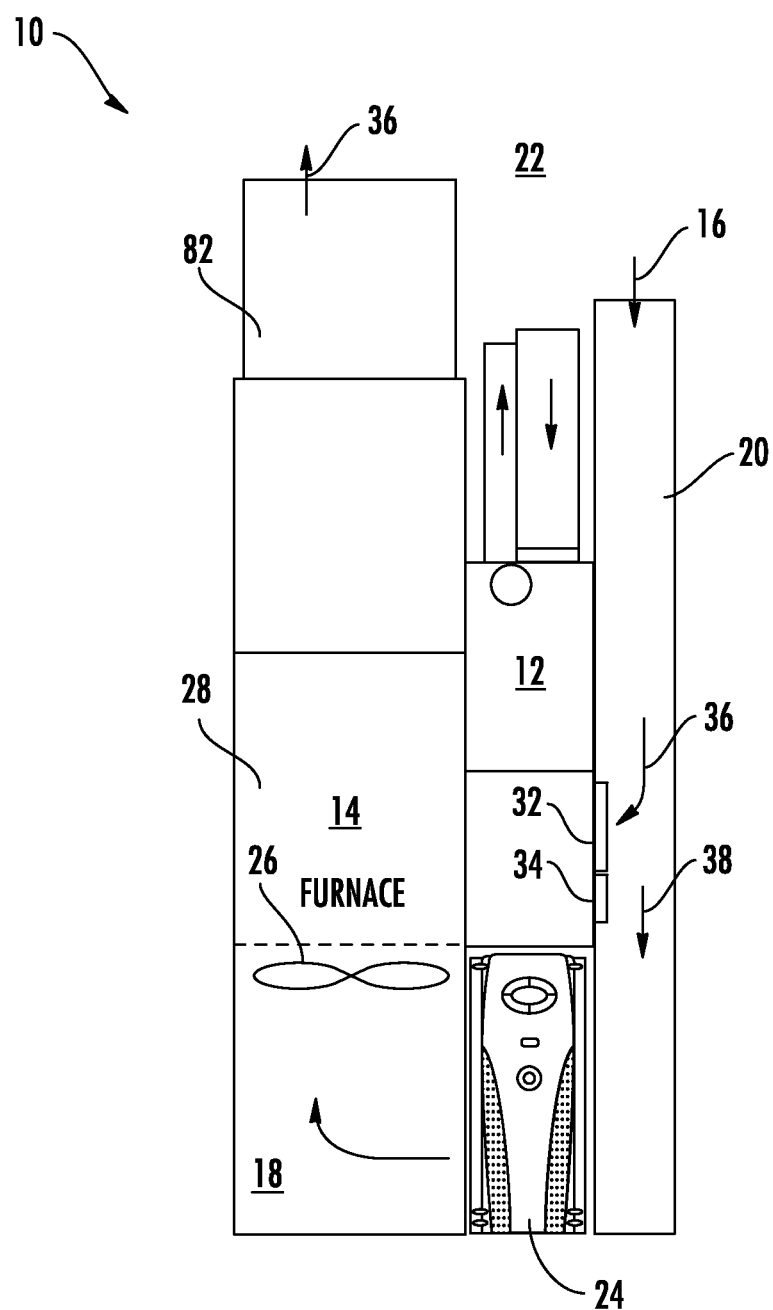
FIG. 2 is a view of another embodiment of a heating or cooling system including an ERV.

In another embodiment, as shown in FIG. 2, the ERV 12 may be directly connected to the return air duct 20 as an alternative to being directly connected to the blower compartment 18. In this embodiment, stale airflow 36 flows from the return air duct 20 into the ERV 12 via the return port 32 and fresh airflow 38 flows from the ERV 12 into the return air duct 20 via the supply port 34. It is to be appreciated that in other embodiments, the ERV 12 may be connected directly to other components of the system 10, such as an air purifier. Further, in other embodiments, the ERV 12 may be connected directly to the system 10, which may be a furnace, fan coil, evaporator coil, or the like.

Figure 3:
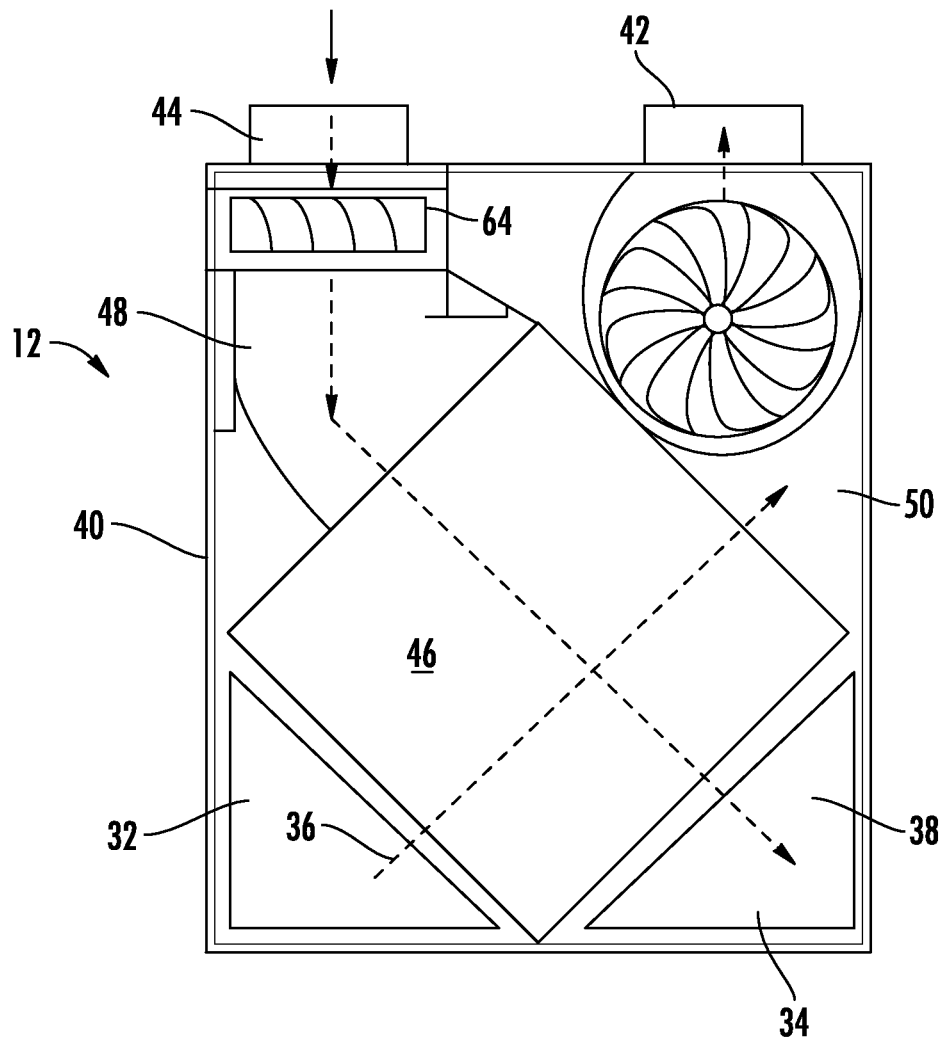
FIG. 3 illustrates an embodiment of an ERV.

FIG. 3 illustrates in more detail the ERV 12 used with heating or cooling system 10. The ERV 12 is utilized to circulate the fresh airflow 38 into the heating or cooling system 10, while recovering energy from the stale airflow 36. The ERV 12 includes an ERV housing 40, and an exhaust port 42 and fresh air port 44. Further, the ERV 12 includes a heat exchanger 46 located in the ERV housing 40. The fresh airflow 38 flows through the ERV 12 from the fresh air port 44 to the supply port 34 across the heat exchanger 46 via a fresh air pathway 48. Similarly, the stale airflow 36 flows from the return port 32 to the exhaust port 42 across the heat exchanger 46 via an exhaust pathway 50. Thermal energy is transferred between the fresh airflow 38 and the stale airflow 36 at the heat exchanger 46.

Referring again to FIG. 1, in many applications space for installing the ERV 12 to the blower compartment 18 may be limited and a structure is necessary to facilitate easily and accurately installing the ERV 12 to the blower compartment 18, while ensuring that a gasket or seal 52 located between the ERV 12 and the blower compartment 18 seals between the components and is not crushed or dislocated during installation of the ERV 12.

Figure 4:
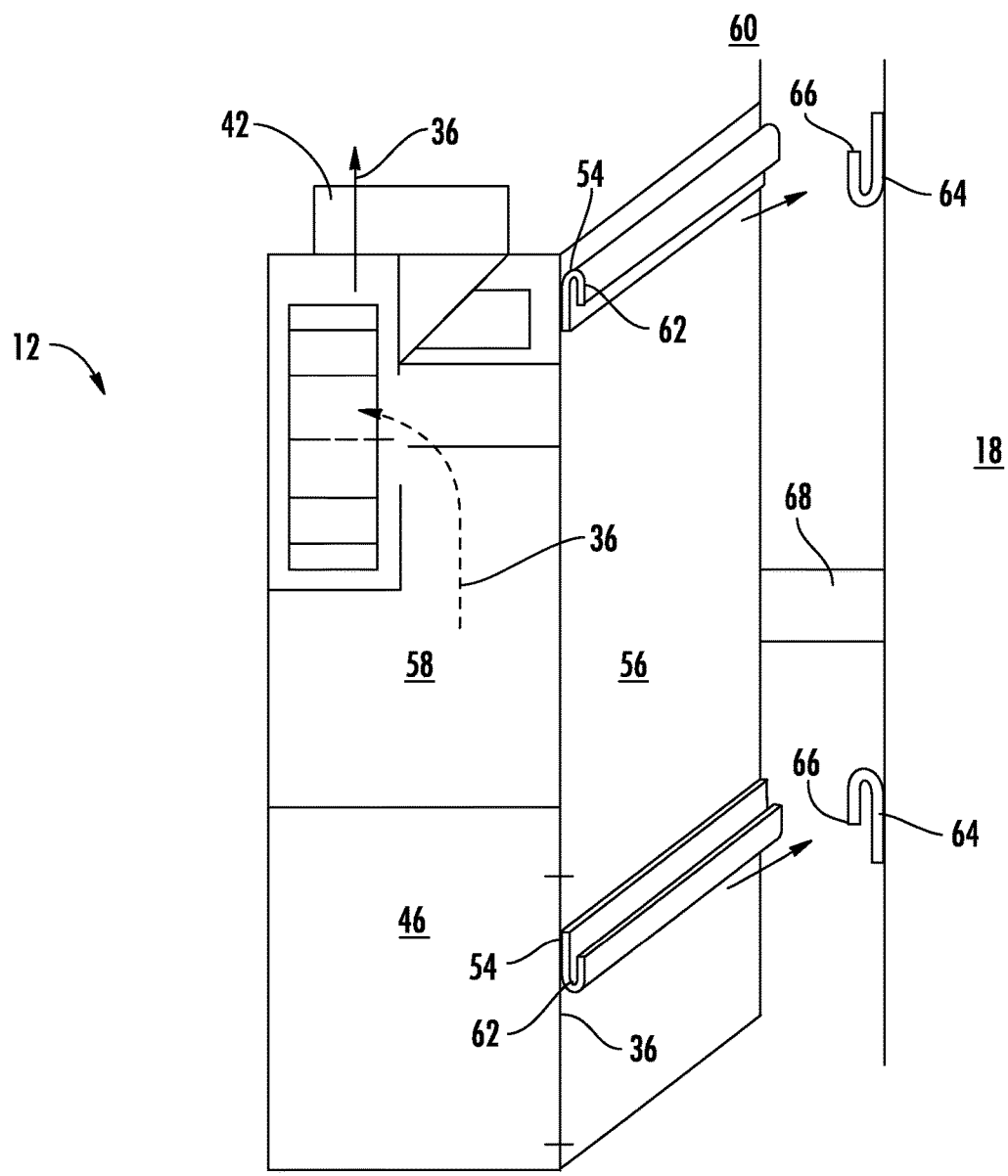
FIG. 4 is a partial view of an ERV during installation to a heating or cooling system.

Shown in FIG. 4 is a partial view of the ERV 12 during installation to the blower compartment 18. One or more interlocking mechanisms, for example, substantially J-shaped ERV cleats 54 are installed to the ERV 12, for example, to a side panel 56 of the ERV 12. The ERV cleats 54 are installed to extend from a front 58 toward a back 60 of the ERV 12. The ERV cleats 54 are installed such that they are parallel to each other, and in this embodiment, with cleat troughs 62 of each ERV cleat 54 facing each other. Similarly, complementary interlocking mechanisms, for example, blower cleats 64 are installed to the blower compartment 18 such that cleat legs 66 of the blower cleats 64 are engageable with the cleat troughs 62 of the ERV cleats 54.

The ERV 12 is installed to the blower compartment 18 by aligning the ERV cleats 54 and the blower cleats 64 such that the cleat legs 66 are inserted into the cleat troughs 62 thus interlocking the blower cleats 64 and the ERV cleats 54. The ERV 12 is then slid or pushed along a length of the blower cleats 64 into an installed position as shown in FIG. 1. Referring again to FIG. 4, a stopper 68, such as a bracket, an additional set of interlocking cleats 54 and 64 at a rear of the ERV 12 and the blower compartment 18 to limit a travel of the ERV 12 at installation and ensure that the ERV 12 is installed in a proper location relative to the blower compartment 18.

Figure 5:
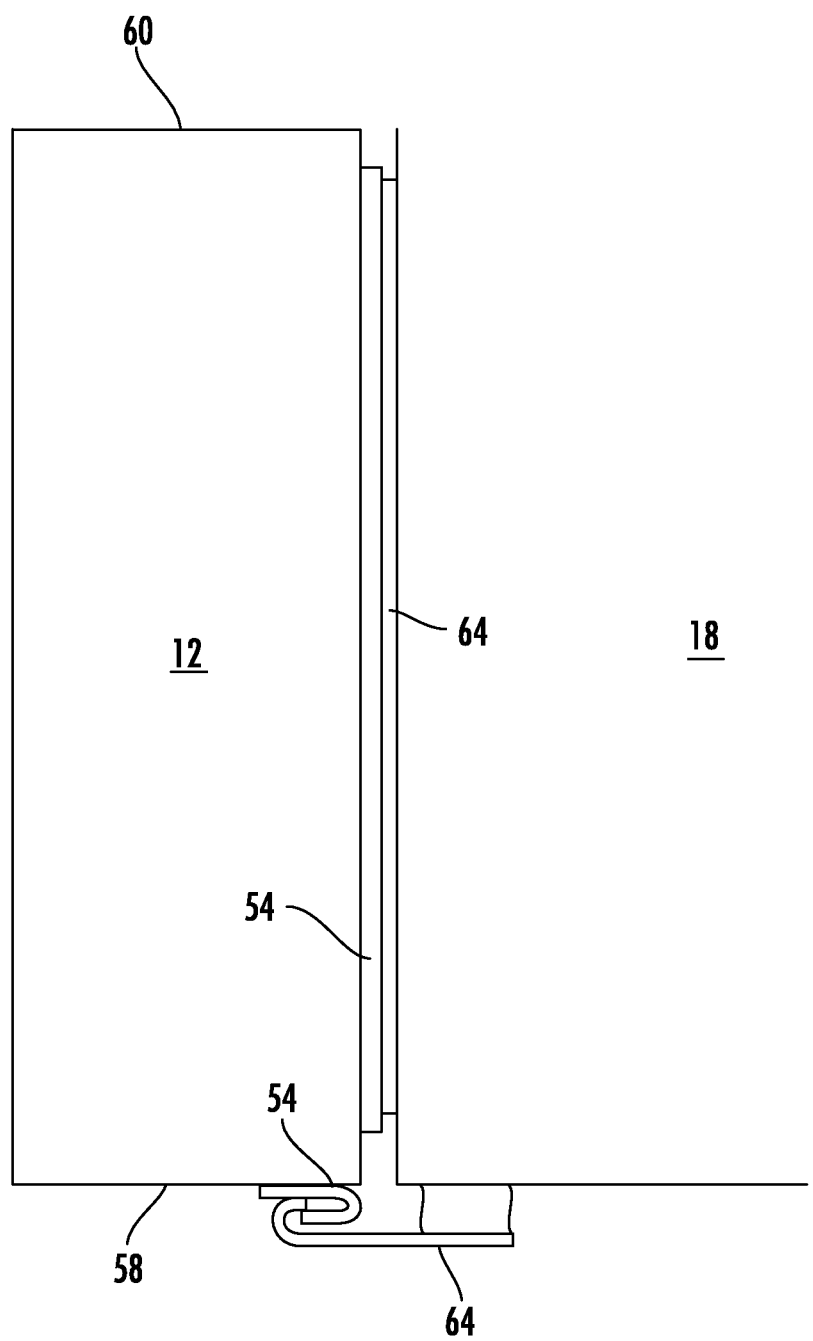
FIG. 5 illustrates an embodiment of an ERV being installed to a heating or cooling system in a horizontal direction.

In other embodiments, such as shown in FIG. 5, a single set of interlocking cleats 54 and 64 extend from front 58 to back 60 of the ERV 12, so that when installed, the ERV 12 hangs on the blower cleat 64 via the ERV cleat 54. An additional blower cleat 64 is located at the front 58 of the ERV 12 and secured to the blower compartment 18. When the ERV 12 is in the installed position, an additional ERV cleat 54 is installed at the front 58 by sliding ERV cleat 54 into engagement with the blower cleat 64, then securing the ERV cleat 54 to the ERV 12. This additional interlocking set of cleats 54, 64 effectively retains the ERV 12 into the installed position. Alternatively, the ERV 12 may be installed by sliding blower cleat 64 into engagement with ERV cleat 54, then securing the blower cleat 64 to the blower compartment 18.

Figure 6:
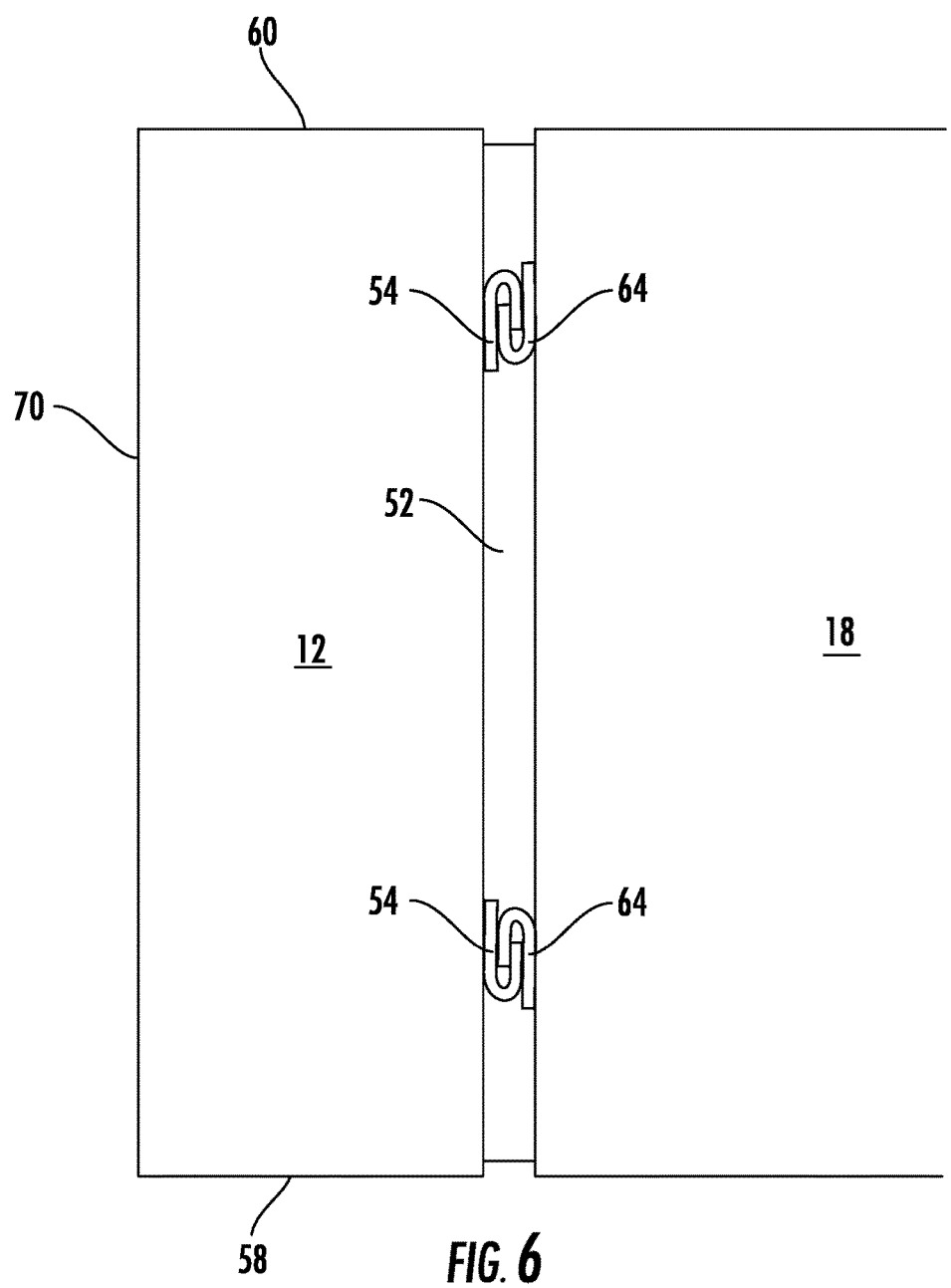
FIG. 6 illustrates an embodiment of an ERV being installed to a heating or cooling system in a vertical direction.

Referring now to FIG. 6, a similar arrangement may be used to install the ERV 12 in a vertical direction to the blower compartment 18, with the sets of interlocking cleats 54 and 64 extending from top 70 of the ERV 12 toward a bottom of the ERV 12. The ERV 12 is slid or urged into the installed position in a vertical direction from above or from below with, in some embodiments, a stopper to limit travel of the ERV 12 and retain the ERV 12 in the installed position.

Figure 7A:
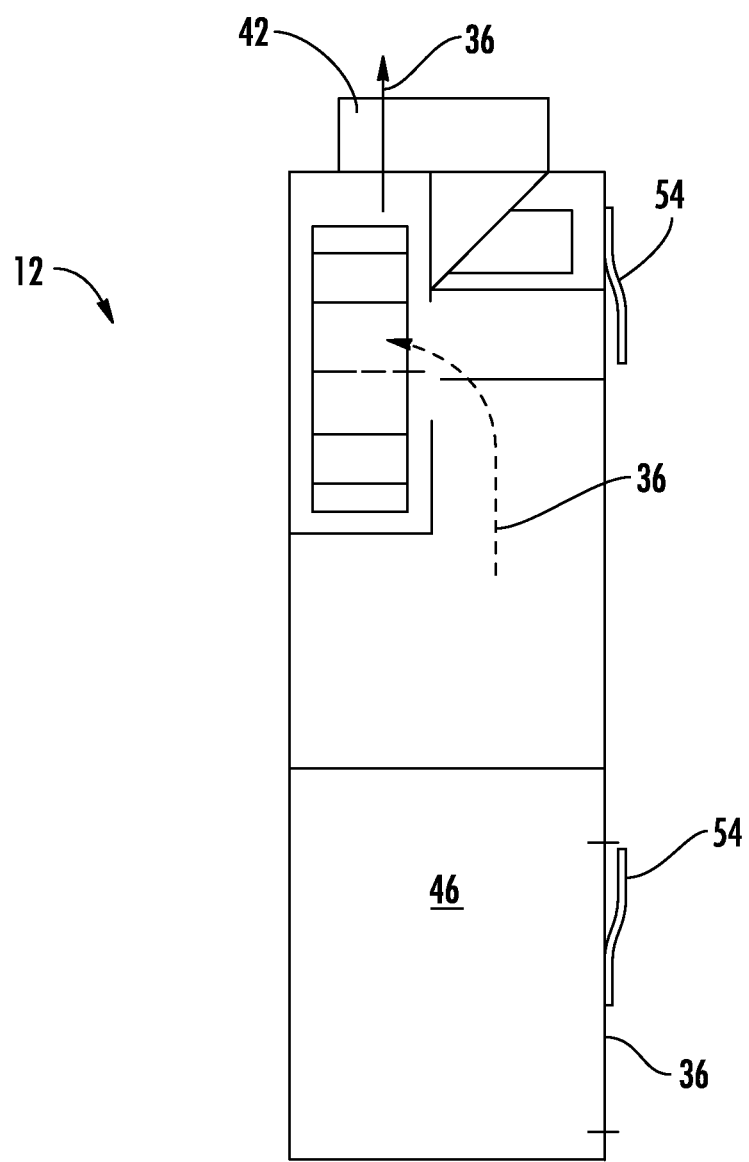
FIG. 7a illustrates an alternative embodiment of a cleat for installing an ERV to a heating or cooling system.
Figure 7B:
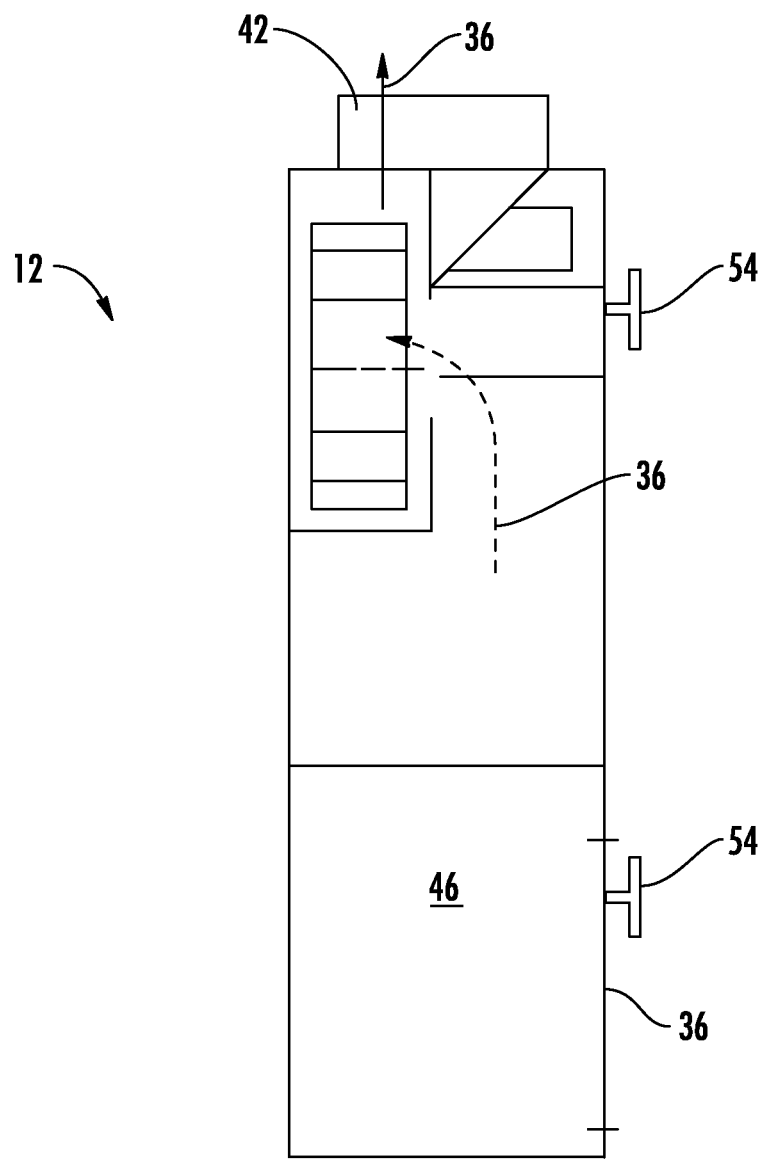
FIG. 7b illustrates another alternative embodiment of a cleat for installing an ERV to a heating or cooling system.

Referring to FIGS. 7a and 7b, while the cleats 54 and 64 in some embodiments have a substantially J-shaped cross-section, other cross-sectional shapes of cleats 54 and 64, such as an S-shaped cleat 54 or 64 shown in FIG. 7a or a T-shaped cleat 54 or 64 shown in FIG. 7b, may be utilized. Further, it is to be appreciated that, while in the embodiments above the ERV 12 is installed directly to the blower compartment 18, in other embodiments the ERV 12 may be installed directly to other components of the heating or cooling system 10 via the cleats 54 and 64, such as, for example, the return air duct 20.

The embodiments described herein greatly simplify the installation of the ERV 12 directly to components of the heating or cooling system 10 to ensure the ERV 12 is correctly located in the selected position aligning with supply port 34 and return port 32. Further, installation via this method ensures sealing between the ERV 12 and the component, such as blower compartment 18 via gasket 74, while not damaging or displacing gasket 74 during installation of the ERV 12. It is to be appreciated that while the above description relates to installation of an ERV 12 to the heating or cooling system 10, the installation structure and method may be applied to the installation of other accessories, for example, an air purifier, humidifier, dehumidifier or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An energy recovery system comprising:
   a heating or cooling system; and
   an accessory operably connected to a heating or cooling system component; and
   one or more J-shaped accessory interlocking cleats disposed at the accessory interlocked with one or more complementary J-shaped component interlocking cleats disposed at the heating or cooling system component to secure the accessory directly to the component;
   wherein the accessory is an energy recovery ventilator including:
      a housing; and
      a heat exchanger disposed in the housing for recovery of thermal energy from an airflow flowing into the energy recovery generator from a return air duct of the heating or cooling system.

2. The energy recovery system of claim 1, wherein the one or more J-shaped accessory interlocking cleats are two or more J-shaped accessory interlocking cleats.

3. The energy recovery system of claim 2, wherein the two or more J-shaped accessory interlocking cleats are parallel to each other.

4. The energy recovery system of claim 2 wherein the two or more accessory interlocking mechanisms are substantially perpendicular to each other.

5. The energy recovery system of claim 1, wherein the one or more J-shaped accessory interlocking cleats have a trough and a leg extending from the trough.

6. The energy recovery system of claim 5, wherein the J-shaped component interlocking cleats are at least partially insertable into the trough.

* * * * *